United States Patent
Zang et al.

(10) Patent No.: US 9,880,816 B2
(45) Date of Patent: Jan. 30, 2018

(54) SIMULATOR WITH LOCAL RESOURCE CAPABILITIES

(71) Applicant: SAP SE, Walldorf, DE (US)

(72) Inventors: Yan Zang, Singapore (SG); Lei Huang, Beijing (CN)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 14/555,668

(22) Filed: Nov. 27, 2014

(65) Prior Publication Data

US 2016/0154630 A1    Jun. 2, 2016

(51) Int. Cl.
*G06F 9/44* (2006.01)
*G06F 9/445* (2006.01)

(52) U.S. Cl.
CPC ............ *G06F 8/34* (2013.01); *G06F 9/44526* (2013.01)

(58) Field of Classification Search
CPC ............ G06F 9/45508; G06F 11/3664; G06F 11/3688; G06F 11/3696; G06F 9/44526; G06F 9/45512; G06F 8/60; G06F 8/20; G06F 8/40; G06F 8/41; G06F 8/70; G06F 17/30887
See application file for complete search history.

(56) References Cited

U.S. PATENT DOCUMENTS

| | | | | |
|---|---|---|---|---|
| 8,413,139 B2* | 4/2013 | Shukla | ................. | G06F 9/44526 718/1 |
| 8,510,333 B2* | 8/2013 | Zafar | ..................... | G06Q 10/00 707/779 |
| 8,745,573 B2* | 6/2014 | Ben-Artzi | ................. | G06F 8/30 717/102 |
| 9,274,784 B2* | 3/2016 | Wang | ......................... | G06F 8/65 |
| 2006/0129982 A1* | 6/2006 | Doyle | ................. | G06F 9/45508 717/115 |
| 2010/0169755 A1* | 7/2010 | Zafar | ..................... | G06Q 10/00 715/205 |
| 2010/0235830 A1* | 9/2010 | Shukla | ................ | G06F 9/44526 718/1 |
| 2011/0258595 A1* | 10/2011 | Clevenger | ................. | G06F 8/40 717/106 |

(Continued)

OTHER PUBLICATIONS

John M. Wargo; An Introduction to SMP Kapsel; 2013 Wargo's blog; 18 pages; <https://scn.sap.com/blogs/johnwargo/2013/10/21/an-introduction-to-smp-kapsel>.*

(Continued)

*Primary Examiner* — Thuy Dao
*Assistant Examiner* — Cuong V Luu
(74) *Attorney, Agent, or Firm* — Jones Day

(57) ABSTRACT

A framework for developing applications is described herein. In accordance with one aspect, an application is developed using an integrated development environment (IDE) with a preview function. The preview function may be selected to preview the application. In response to the selection of the preview function, the IDE causes a companion application on an end-user device to be launched onto an application simulator on the end-user device. The companion application is a container application that includes plugins of local resources. The application may be run in the companion application, where the application may access local resources provided by the companion application.

21 Claims, 12 Drawing Sheets

(56) References Cited

U.S. PATENT DOCUMENTS

| | | | | |
|---|---|---|---|---|
| 2013/0205277 | A1* | 8/2013 | Seven | G06F 8/38 717/121 |
| 2013/0326333 | A1* | 12/2013 | Hashmi | G06F 17/2247 715/234 |
| 2014/0325470 | A1* | 10/2014 | Padmavilasom | H04L 67/2823 717/100 |
| 2015/0347119 | A1* | 12/2015 | Wang | G06F 8/65 717/120 |
| 2016/0092348 | A1* | 3/2016 | Straub | G06F 11/3684 717/124 |
| 2016/0154629 | A1* | 6/2016 | Noens | G06F 8/30 717/107 |

OTHER PUBLICATIONS

Fangming Liu et al.; Gearing Resource Poor Mobile Devices With Powerful Clouds Architectures Challenges and Applications; 2013 IEEE; pp. 14-22; <http://ieeexplore.ieee.org/stamp/stamp.jsp?arnumber=6549279>.*

Mohammad Zulhasnine et al.; Efficient Resource Allocation for Device-to-Device Communication Underlaying LTE Network; 2010 IEEE; pp. 368-375; <http://ieeexplore.ieee.org/stamp/stamp.jsp?arnumber=5645039>.*

Alan Messer et al.; Towards a Distributed Platform for Resource-Constrained Devices; 2002 IEEE; 9 pages; <http://ieeexplore.ieee.org/stamp/stamp.jsp?arnumber=1022241>.*

Mendel Rosenblum et al.; Complete Computer System Simulation The SimOS Approach; 1995 IEEE; pp. 34-43; <http://ieeexplore.ieee.org/stamp/stamp.jsp?arnumber=473612>.*

Victor Shnayder et al.; Simulating the Power Consumption of Large-Scale Sensor Network Applications; 2004 ACM; pp. 188-200; <https://dl.acm.org/citation.cfm?id=1031518>.*

Michael Becher et al.; Mobile Security Catching UpRevealing the Nuts and Bolts of the Security of Mobile Devices; 2011 IEEE; pp. 96-111; <http://ieeexplore.ieee.org/stamp/stamp.jsp?arnumber=5958024>.*

* cited by examiner

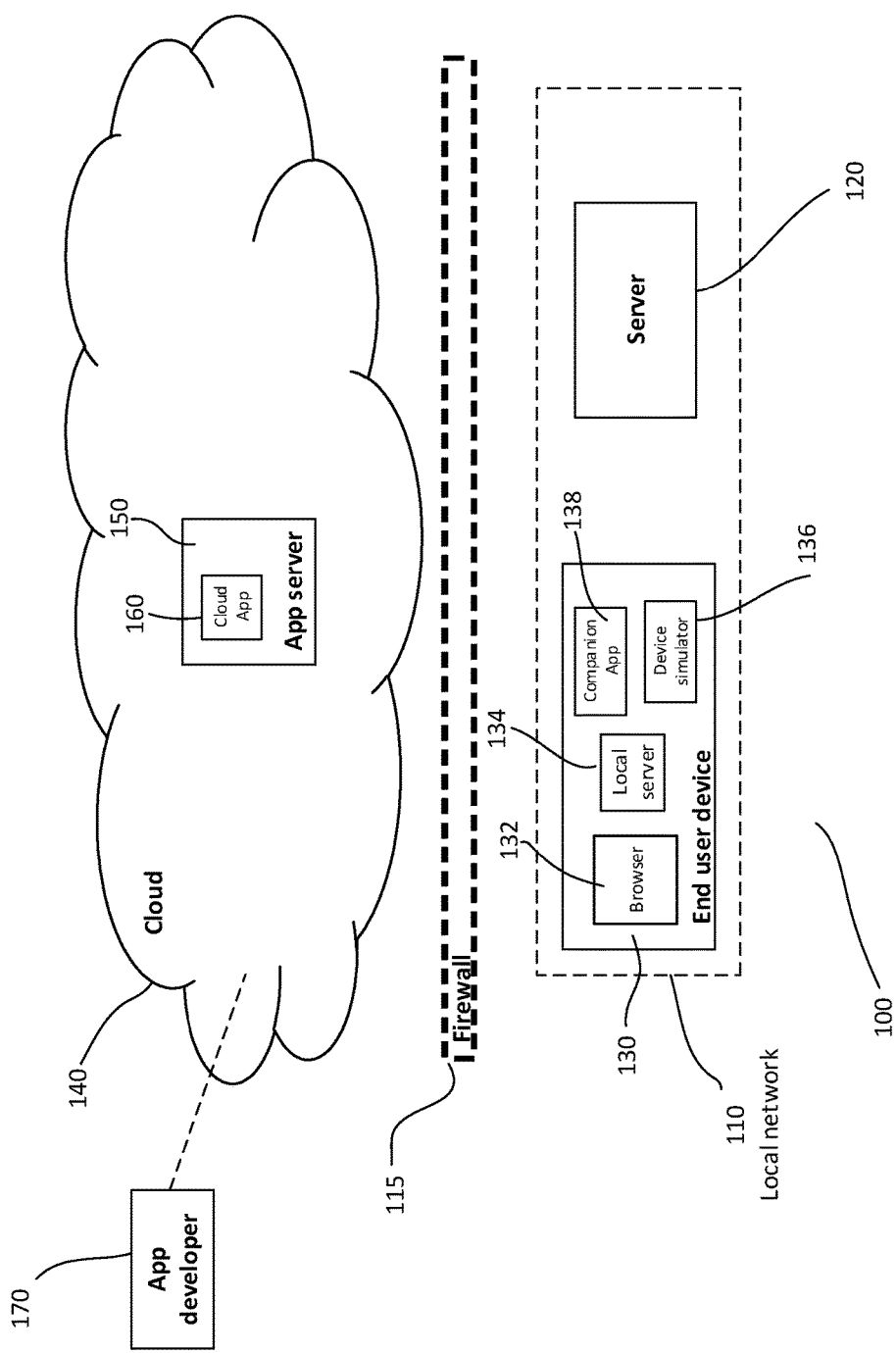

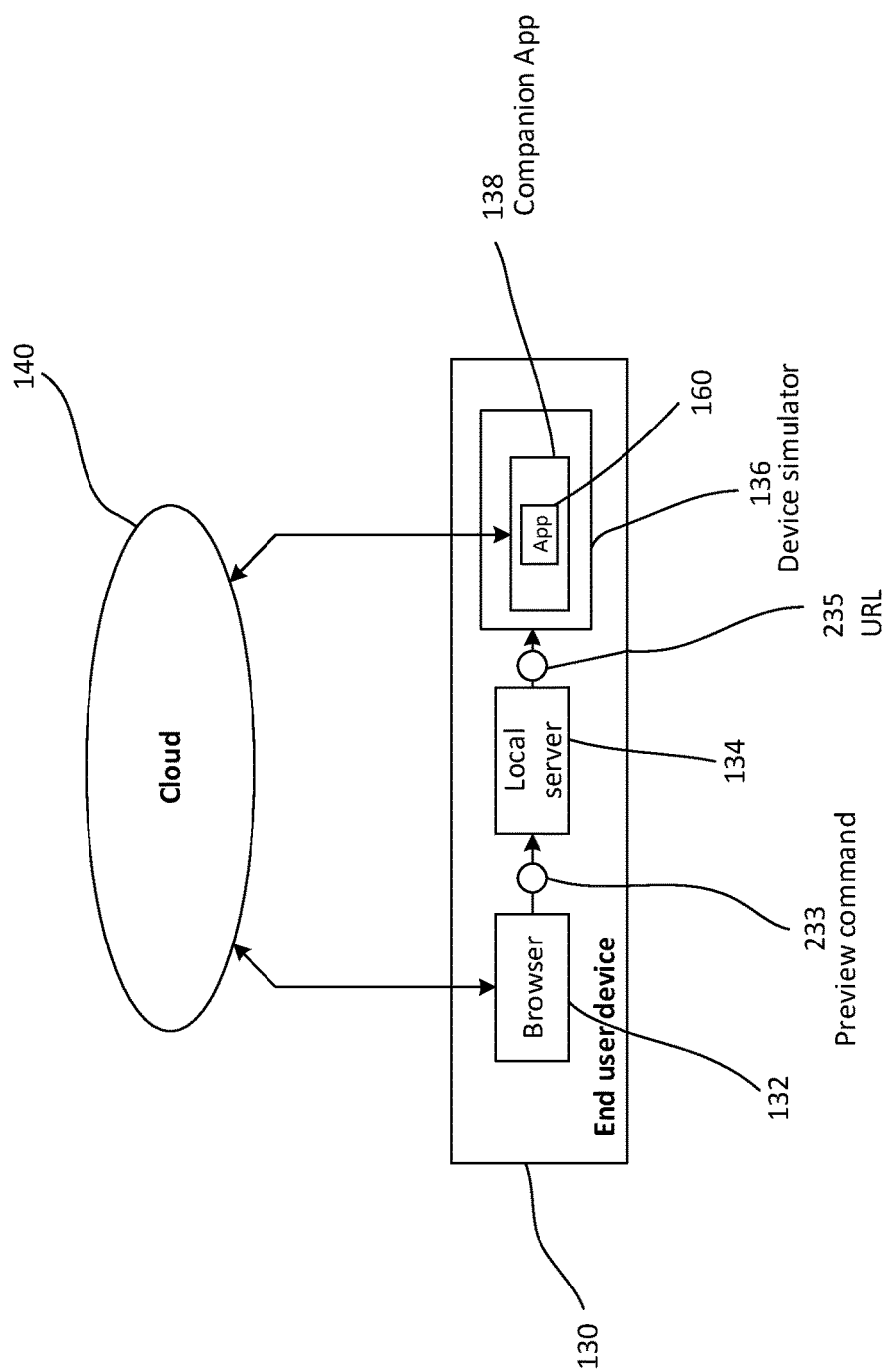

001# SIMULATOR WITH LOCAL RESOURCE CAPABILITIES

TECHNICAL FIELD

The present disclosure relates generally to a framework for developing applications (Apps).

BACKGROUND

Apps are developed for a wide variety of purposes. Cloud Apps, for example, reside on the cloud. To develop cloud Apps, a cloud-based integrated development environment (IDE) may be used. To facilitate development, the IDE may include a simulator. The simulator simulates the operations of the App under development. However, conventional IDEs are incapable of simulating local resources. For example, if an App calls for use of local resources, such as a camera, the simulator is incapable of simulating this function. This hinders development of Apps.

From the foregoing discussion, it is desirable to provide an App simulator which can simulate use of local resources to improve App development.

SUMMARY

A framework for developing applications is described herein. In accordance with one aspect, an application is developed using an integrated development environment (IDE) with a preview function. The preview function may be selected to preview the application. In response to the selection of the preview function, the IDE causes a companion application on an end-user device to be launched onto an application simulator on the end-user device. The companion application is a container application that includes plugins of local resources. The application may be run in the companion application, where the application may access local resources provided by the companion application.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

FIG. 1 shows an implementation of an environment;

FIG. 4 shows a simplified component diagram depicting previewing of an App by a simulator.

DETAILED DESCRIPTION

Figure 2A:
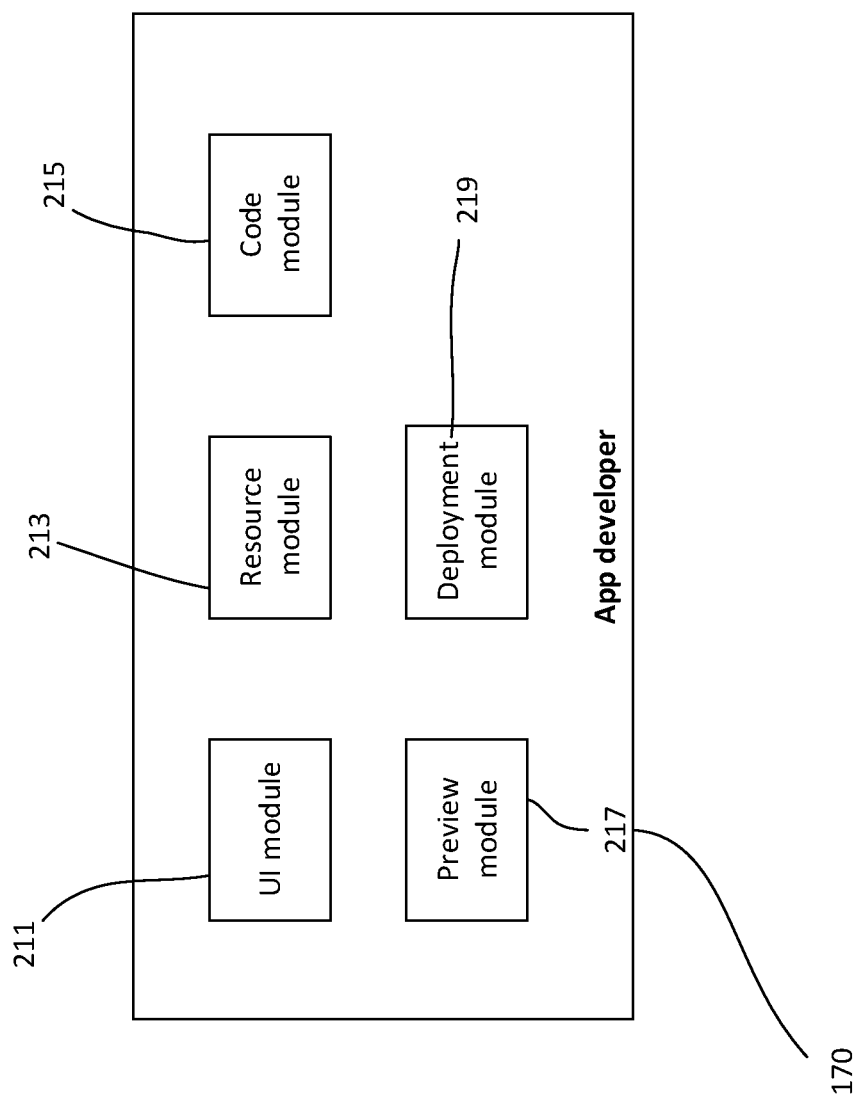
FIG. 2a shows a simplified block diagram of an embodiment of an App developer.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

FIG. 1 shows a simplified diagram of an exemplary environment or architecture 100. Environment 100 may have a distributed architecture. In one implementation, the environment includes a cloud 140. The environment, for example, includes a cloud computing environment. The cloud, for example, includes interconnected servers. For example, the servers are connected through a communication network. The communication network may be an internet, an intranet, a local area network (LAN), a wide area network (WAN) or a combination thereof. The servers of the cloud may be located in a single or multiple locations.

A server may include one or more computers. A computer includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component. The computers of a server are connected through a communication network, such as internet, intranet, LAN, WAN or a combination thereof.

Illustratively, the cloud includes an application server 150. The application server is configured to host and process cloud applications (Apps) 160. The cloud Apps, for example, are mobile Apps which are run on mobile devices. In one implementation, the application server 150 includes hybrid Apps. Hybrid Apps, for example, are hosted on the cloud but utilizes local resources of a local device on which they run. Other types of application may also be included in the application server. The cloud may also include a resource server (not shown). The resource server, for example, is configured to host data or other resources used by the cloud applications. Such hosting and processing may be considered as cloud services provided by the cloud. Various types of cloud services may be provided. The cloud services may be provided in a public, private or hybrid network. The cloud services may be provided by a cloud service provider. For example, the cloud services may be Helium, provided by SAP SE. Other types of clouds and cloud providers may also be useful.

The environment 100 includes an end-user device 130. An end-user may connect to the cloud using the end-user device. The end-user device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as an end-user device. For example, the end-user device may be a PC, a tablet PC, a workstation, a network computer, or a mobile computing device, such as a laptop, a tab or a smart phone. Other types of processing devices may also be used. The environment of the end-user device may be referred to as a local or native environment. End-user and end-user device may be used interchangeably. For example, when referring to an end-user, it is understood that the end-user connects to the cloud using an end-user device. The end-user device may be referred to as the client side while the cloud may be referred to as the cloud side.

The end-user device may be part of a local network 110 with other end user devices (not shown) and a server 120. The local network, for example, is a private network, for instance, a network of a private entity, such as a company or an individual. Other types of local networks may also be useful. The server of the local network may be referred to as a local server. The local server may include one or more computers. The computers of a server are connected through a communication network, such as internet, intranet, LAN, WAN or a combination thereof. In one implementation, the local server and end-user device are located on the same location. In some cases, the local device and the server may be the same device or computer. Other configurations of the local server and end-user device may also be useful.

Connection to the cloud may be through the internet. The interconnect connection may be using a mobile telecommunication network, such as a 4G network. Other types of connections to the cloud may also be useful. An end-user may access the cloud by having a cloud account. For example, an end-user may access cloud services by logging onto a user account. An end user may access a cloud application using, for example, a web browser in the local network. For security, a firewall 115 may be present between the cloud and the local network. The firewall, for example, may be a SAP ID service. Other types of firewalls may also be useful. The firewall ensures that the resources on the local server are inaccessible from outside.

The environment includes an application (App) developer 170. The App developer is a software tool for developing Apps. The development tool, for example, is used to develop cloud Apps. The developer, in one implementation, is used to develop hybrid Apps. Developing other types of Apps may also be useful. In one implementation, the development tool is an integrated development environment (IDE). The IDE may be a wizard-based IDE. For example, the IDE includes wizards to guide the developer in developing Apps. In one implementation, the IDE is a web-based IDE. The web-based IDE 170 resides in the cloud, as indicated by dotted line in FIG. 1. For example, the web-based IDE resides on a server in the cloud. The server on which the IDE resides may be different than the application server 150. The web-based IDE is accessed by a web browser on an end-user device. For example, a developer or end-user may log on to the cloud, accessing the IDE from the web browser of an end-user device. The IDE, for example, may be a SAP River IDE from SAP SE. Other types or configurations of IDEs may also be useful.

In one implementation, the local environment of the end-user device includes a browser 132, a local server component 134 and a device simulator 136. The browser, for example, may be employed to access applications on the cloud, including the App developer 170. The local server component 134 bridges the gap between cloud-based App developer and command line environment of the end-user device. For example, the local server component 134 enables the local command line environment to be accessed by the cloud-based App developer through the browser. The server component may receive a web request from the cloud-based App developer when it executes a corresponding command in the command line environment as a bridge. In one implementation, the local server component is a node JS-based server component. Other types of local server component may also be useful.

In one implementation, the device simulator 136 is a mobile device simulator. The mobile device simulator, for example, is capable of simulating various types of mobile device. For example, the mobile device simulator is capable of simulating an android-based, windows-based or iOS-based mobile device. Providing a simulator which simulates other devices may also be useful.

In one implementation, the local environment includes a companion App 138. The companion App is a native App which runs in the local environment. In one implementation, the companion App is a container App. The container App is configured to provide an environment in which an App runs. For example, a hybrid App on the cloud runs in the companion App. In one implementation, the companion App includes plugins for local resources. For example, the companion App includes Cordova plugins. Other types of plugins may also be useful. The plugins provide local resources to the hybrid App when running within the container App.

In one implementation, the companion App is configured to run in the device simulator. In one implementation, the companion App is configured to run in the device simulator in parallel with the App developer or IDE.

The local server component enables an end-user to deploy and launch the companion App on the device simulator from within the App developer. This is because the App developer can access the command line environment of the end user device. For example, the App developer accesses the command line environment in end-user device or desktop workstation to deploy and launch the companion App on the device simulator. The App under development may be run in the device simulator within the companion App. For example, the location of the App, such as the universal resource locator (URL), is sent to the local server component 134 from the IDE and passed to the Companion App 138 on the simulator 136 through the command executed in the command line environment. Native resources are provided by the companion App. This facilitates App development by providing access to local resources during simulation.

In one implementation, the companion App includes various capabilities to facilitate designing an App. For example, the companion App may include multi-touch gesture functions for facilitating layout design of the App. Additionally, the companion App may include collaboration functions to facilitate designing the App with multiple designers. Such collaboration functions, for example, include view capabilities by multiple end-users. Other types of collaboration functions as well as other functions may also be useful.

FIG. 2a shows a simplified block diagram of an embodiment of an App developer 170. As shown, the App developer includes various modules for developing an App. In one implementation, the App developer includes a UI module 211, resource module 213, code module 215, preview module 217 and deployment module 219. Providing different or additional modules may also be useful.

The resource module includes resources for creating or developing a hybrid App. For example, the resource module includes various templates for different types of Apps. For example, templates, such as Kapsel App templates, Fiori Templates and plugins, vertical business to enterprise (B2E)

App templates and business to customer (B2C) App templates may be provided in the resource module. Providing templates for other types of Apps may also be useful. The resource module may include other types of resources for developing Apps. Such resources may include design resources, such as layout command resources. For example, mobile controls, mobile UI components and context model designers may be included in the resource module. A context model designer is used, for example, to design reasoning model for a context-aware application. For example, context model designer may be such as those included in IDEs, for instance, SAP Hana Studio IDE. Other types of resources may also be included.

The code module facilitates coding for the App. For example, an App designer may employ the code module to generate codes for the App. In one implementation, the code modules include a code editor for manual coding as well as auto-coding capabilities for completing codes. For example, coders for completing Kapsel and Cordova plugins, drag and drop Kapsel and Cordova code snippets and drag and drop context code snippets may be provided. Other coders may also be included in the coding module. Coders, for example, may be such as those included in Eclipse IDEs. The generated codes may be modified using the code editor.

The preview module facilitates previewing an App that has been developed or is under development. In one implementation, the preview module cooperates with a device simulator and companion App residing in the native environment of an end-user device. Previewing of the App is achieved by running the App within the companion App using the device simulator. For example, the URL of the App to be previewed is passed to the simulator. In one implementation, when user invokes the command in the browser to preview an App under development, the URL of the App may be passed to the local server component. The local server component executes a command in the command line environment to launch the Companion App in the simulator and passes the URL of the App under development to the Companion App and run it inside the Companion App.

The deployment module includes functions to facilitate deployment of the App. The App may be deployed to SMP and mobile device. The SMP is a mobile server from SAP which manages the life cycle of mobile applications on the devices. For example, when the deployment command is selected, the deployment module configures the App, simplify settings, build the App and deploy it. Deployment functions, for example, may be found in an IDE, such as an eclipse-based SAP SUP.

As for the UI module, it may be a graphical UI (GUI) module. The UI module enables a user to navigate the IDE. For example, the UI may include a menu bar with commands or functions which a user can select. The commands and functions facilitate in the process of creating, testing and deploying the App.

Figure 2B:
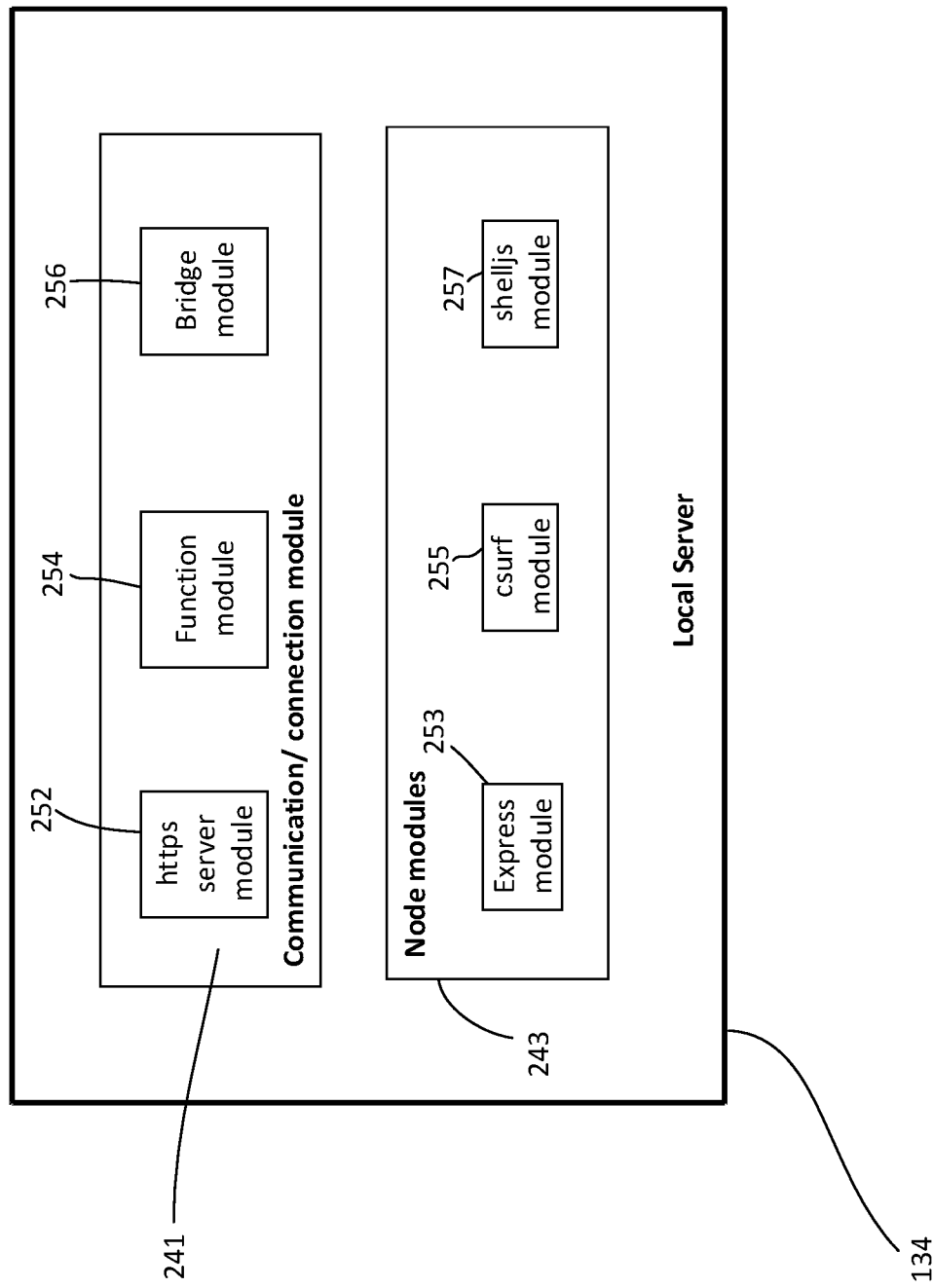
FIG. 2b shows a simplified block diagram of an embodiment of a local server component.

FIG. 2b shows a simplified block diagram of an embodiment of a local server component 134. As shown, the local server component includes various modules for bridging the gap between a cloud-based App developer and the local command line environment. In one implementation, the local server component 134 includes a communication or connection module 241. The communication module 214 may include a https server module 252, function modules 254 and a bridge module 256. The https server module facilitates communication with the cloud, such as the cloud-based App developer. The functional modules relate to various functions or commands from the cloud. For example, the functional modules are based on various commands from the cloud-based App developer, such as the preview command. Other functions or commands from the cloud-based App developer may also be useful. The bridge module, in one implementation, generates and runs command scripts in the local command line environment. For example, based on the command, the bridge module generates and runs the command script in the command line of the local command line environment.

Additionally, the local server component includes node modules 243. The node modules include, for example, an express module 253, csurf module 255 and shelljs module 257. These node modules, for example, are employed for security and command execution. Other node modules may also be included.

Figure 2C:
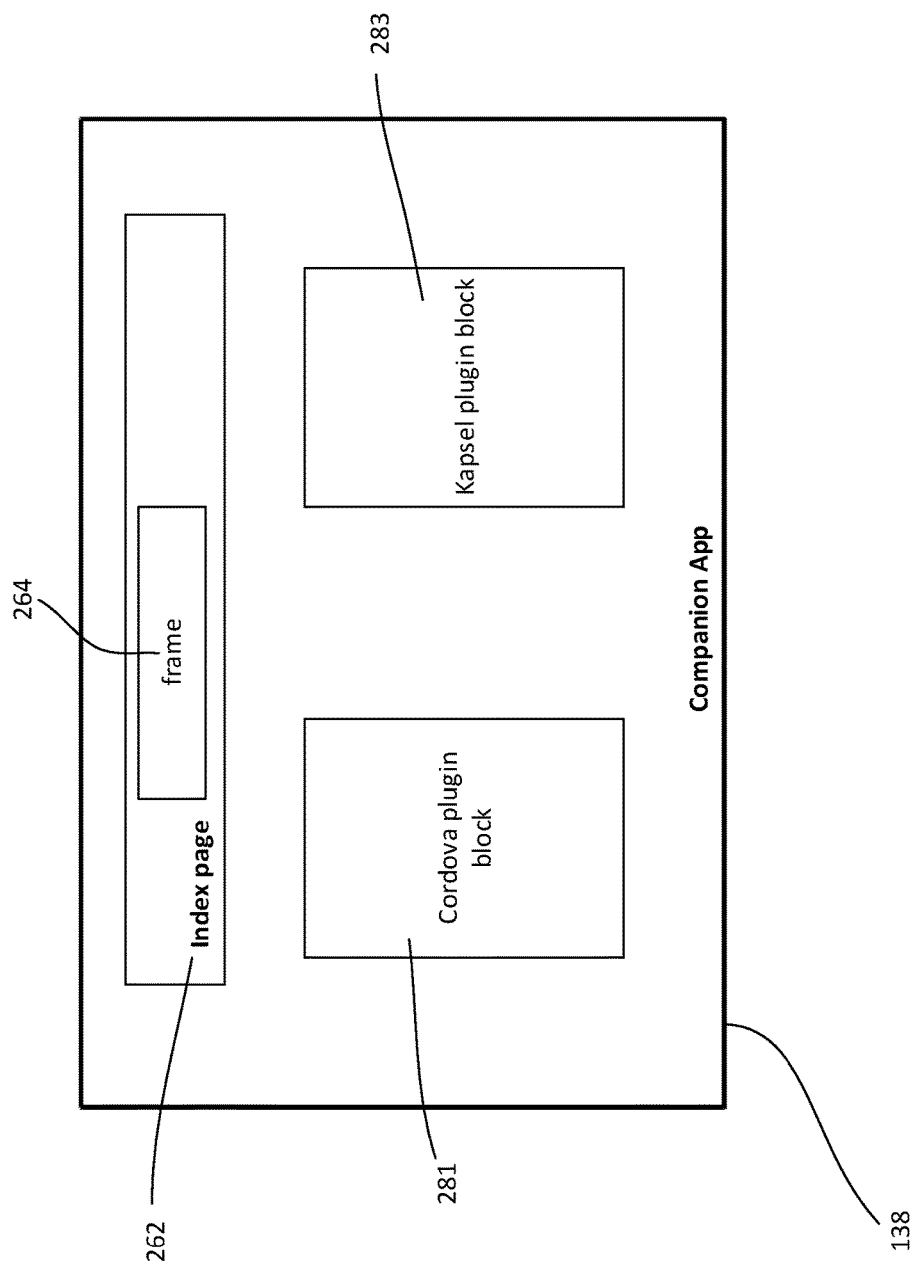
FIG. 2c shows a simplified block diagram of an embodiment of a companion App.

FIG. 2c shows a simplified block diagram of an embodiment of a companion App 138. The companion App is a native App which is run in a simulator in an end-user device. As shown, the companion App includes an index page 262 having a frame 264. An App under development may run in the frame of the companion App. For example, the frame may be an iFrame for containing and running the App inside it.

The companion App includes a local resource plugin module. The companion App includes different plugin blocks in the plugin module. As shown, the plugin module includes a Cordova plugin block 281 with Cordova plugins and a Kapsel plugin block 283 with Kapsel plugins. For example, the Cordova plugins may include device, camera and media plugins while the Kapsel plugins may include application preferences, authentication proxy and bar code scanner plugins. Providing other types of plugins or local resource plugin blocks may also be useful.

Figure 3:
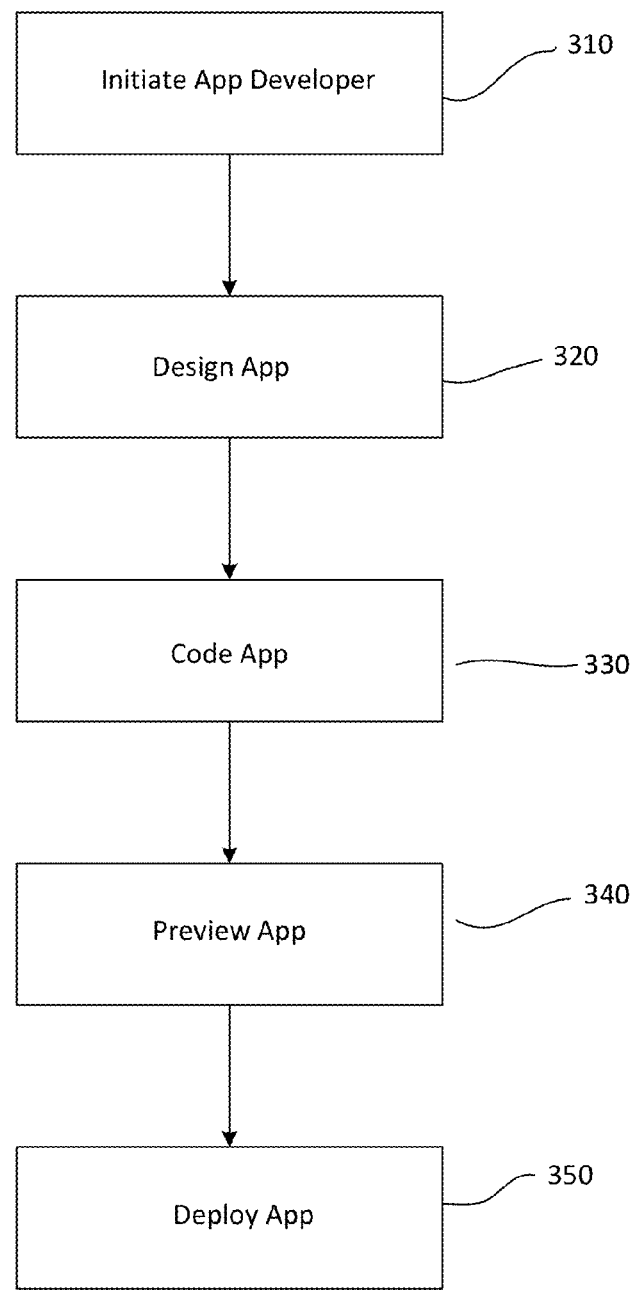
FIG. 3 shows a simplified process flow for designing an App.

FIG. 3 shows a simplified process flow 300 for designing an App. As shown, a user may initiate the App developer on the cloud at step 310. For example, a user may, through the browser of the end-user device, initiate the App developer for creating an App, such as a hybrid App. At step 320, the user designs the App using the IDE. The App is coded at step 330. The user may preview the App at step 340. For example, the user may select the preview command in the browser. This causes the IDE to pass the command and URL of the App to the device simulator. For example, the App is run within the companion App in the device simulator. After the App is completed, the App is deployed. For example, the deployment command is selected, causing the IDE to deploy the App.

FIG. 4 shows a simplified component diagram 400 depicting previewing of an App by a simulator. As shown, an IDE resides in a cloud 140. An end user device 130 accesses the IDE on the cloud using a browser 132. After an App has been developed, the user selects, for example, a preview command 233 in the UI on the browser. This causes the preview command 233 to be passed to a local server component 134. The local server component activates the simulator 136. In one implementation, the URL 235 of the App residing in the cloud is passed to the simulator. The App 160 is then run in the companion App in the simulator 138, previewing it on the browser.

For example, when a user invokes the preview on simulator command in the browser to preview an App under development, the URL of the App will be passed to the local server component. The local server component executes a command using the command line environment to launch the Companion App in the simulator. The URL of the App under development is passed to the Companion App for running inside the Companion App.

Figure 5A:
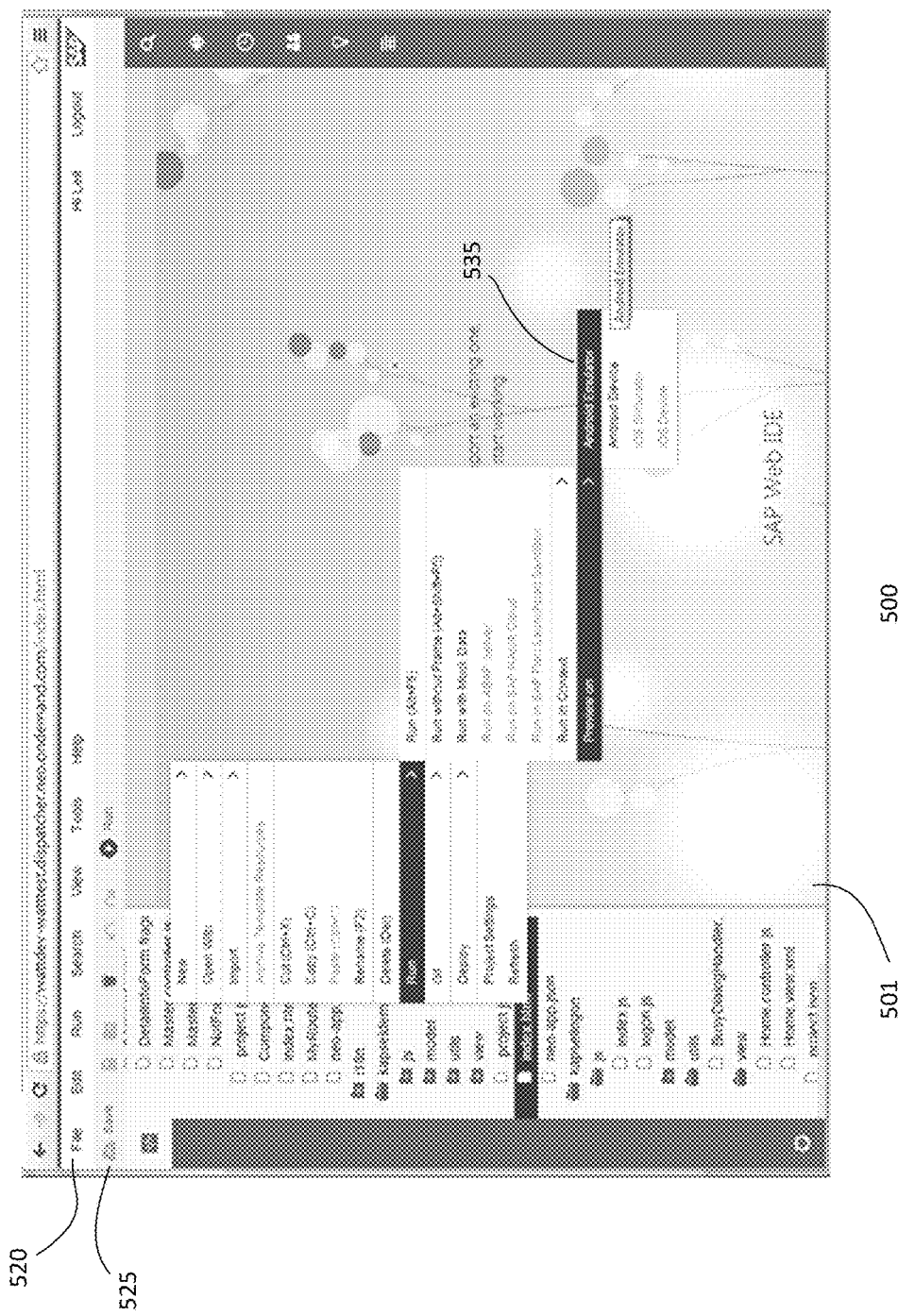
FIGS. 5a-f show exemplary screen shots depicting a process for previewing an App running on a simulator.

FIGS. 5a-f show exemplary screen shots depicting a process 500 for previewing an App running on a simulator. Referring to FIG. 5a, a screen shot of a console window 501 of an IDE is shown. In one implementation, the IDE is a SAP Web IDE which resides in the cloud. The console window includes a menu bar 520 and a quick command bar 525. The menu bar facilitates navigation of the IDE. The console window illustrates triggering a preview on an android emulator or simulator 535 in the IDE by selecting the appropriate menu and sub-menu items. A user may select other simulators, depending on the platform. For example, on MAC, iOS and Android simulators can be selected while only an android simulator can be selected on Windows.

Figure 5B:
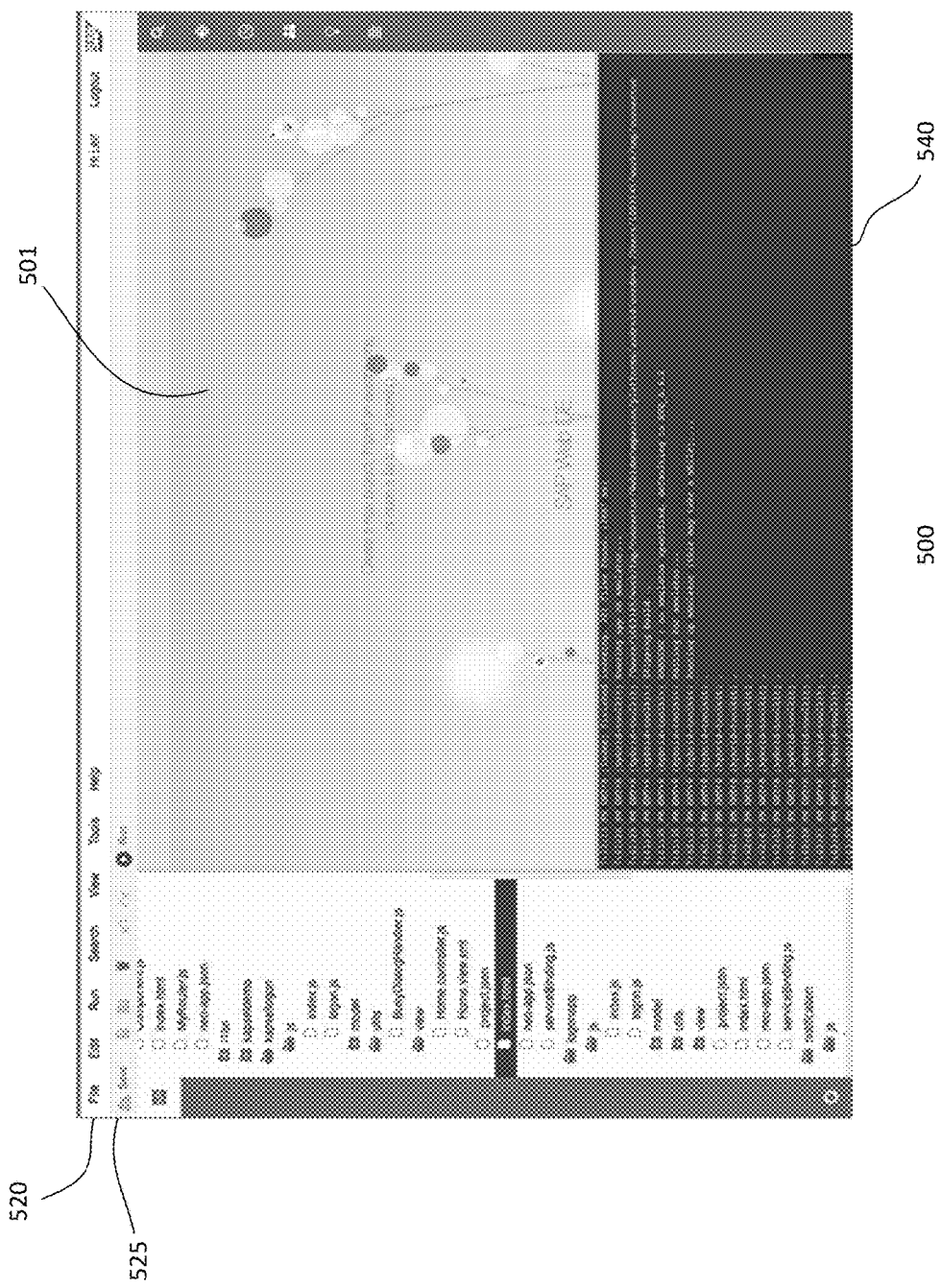

In FIG. 5b, the console window includes a command line display 540, showing commands to initiate the android simulator. The command line display is provided when the android emulator (or simulator) is triggered.

Figure 5C:
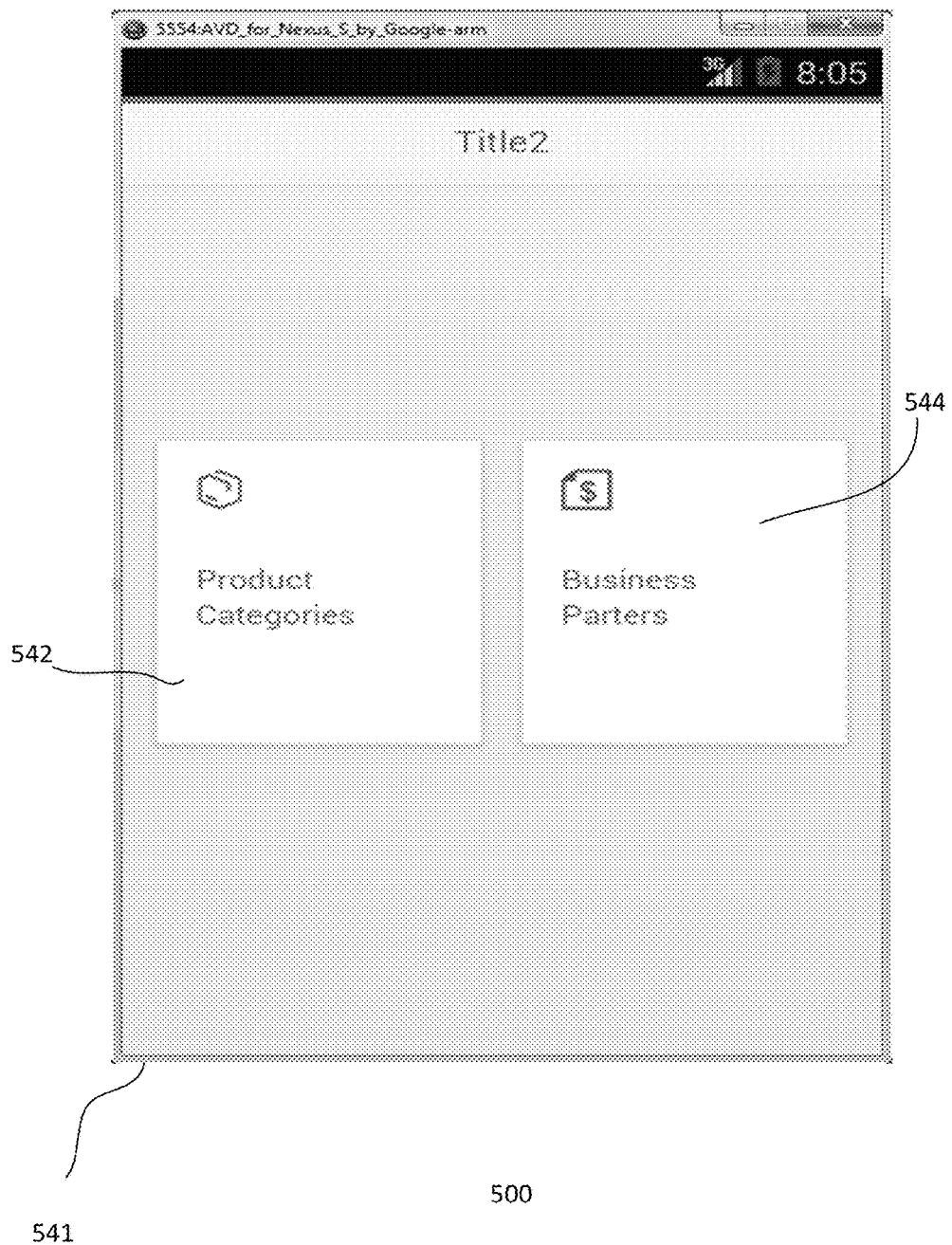
Figure 5D:
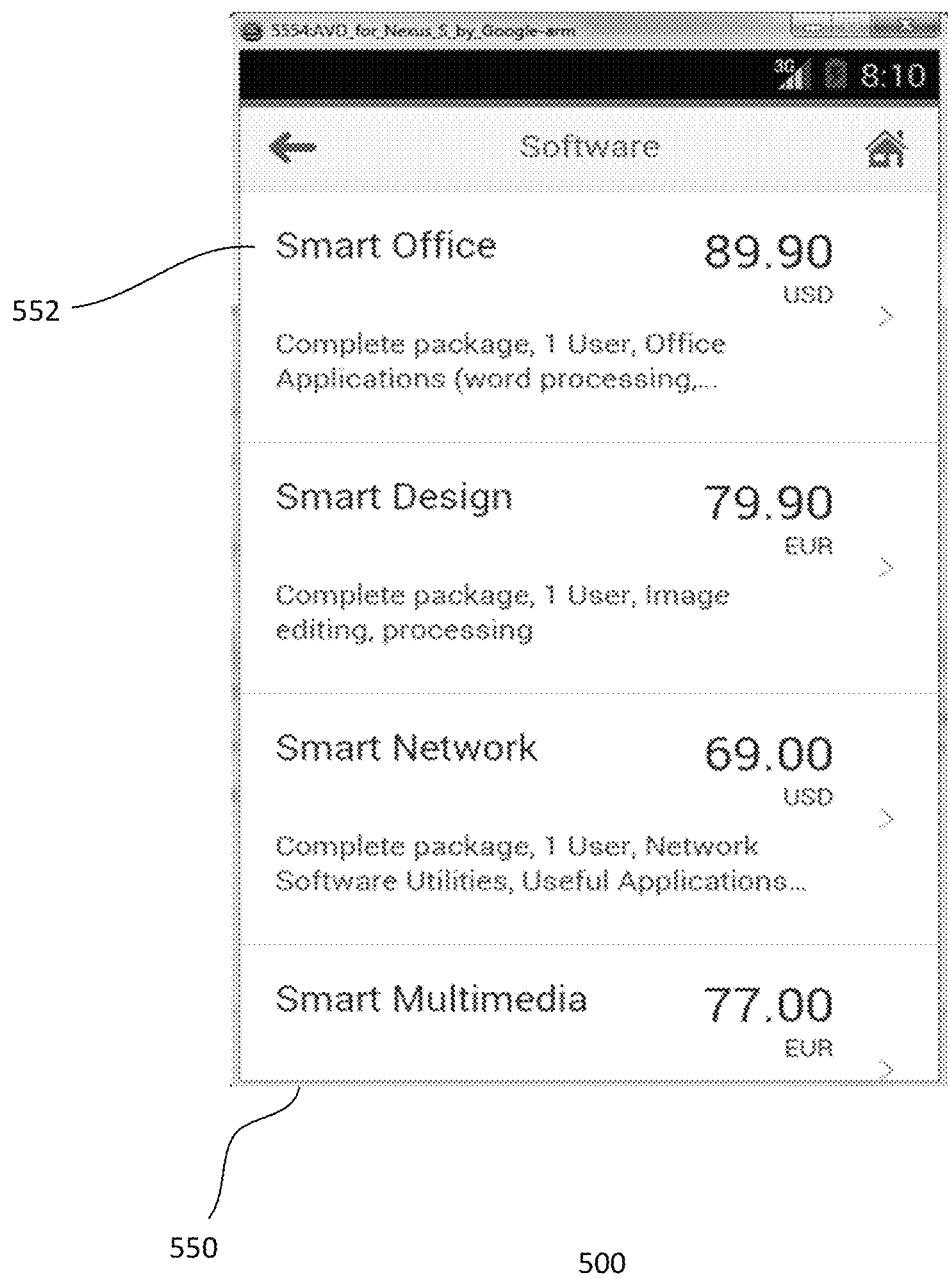
Figure 5E:
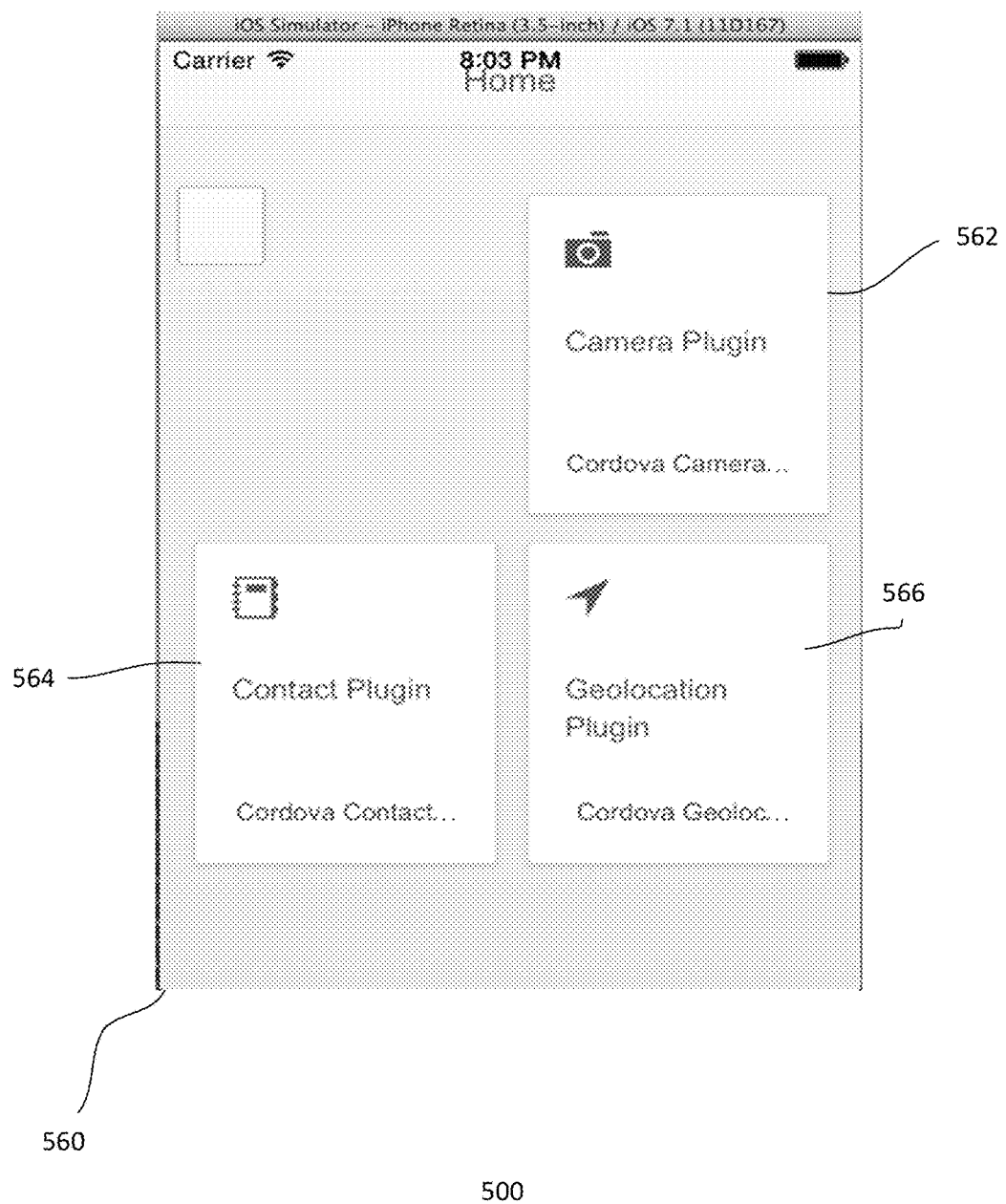
Figure 5F:
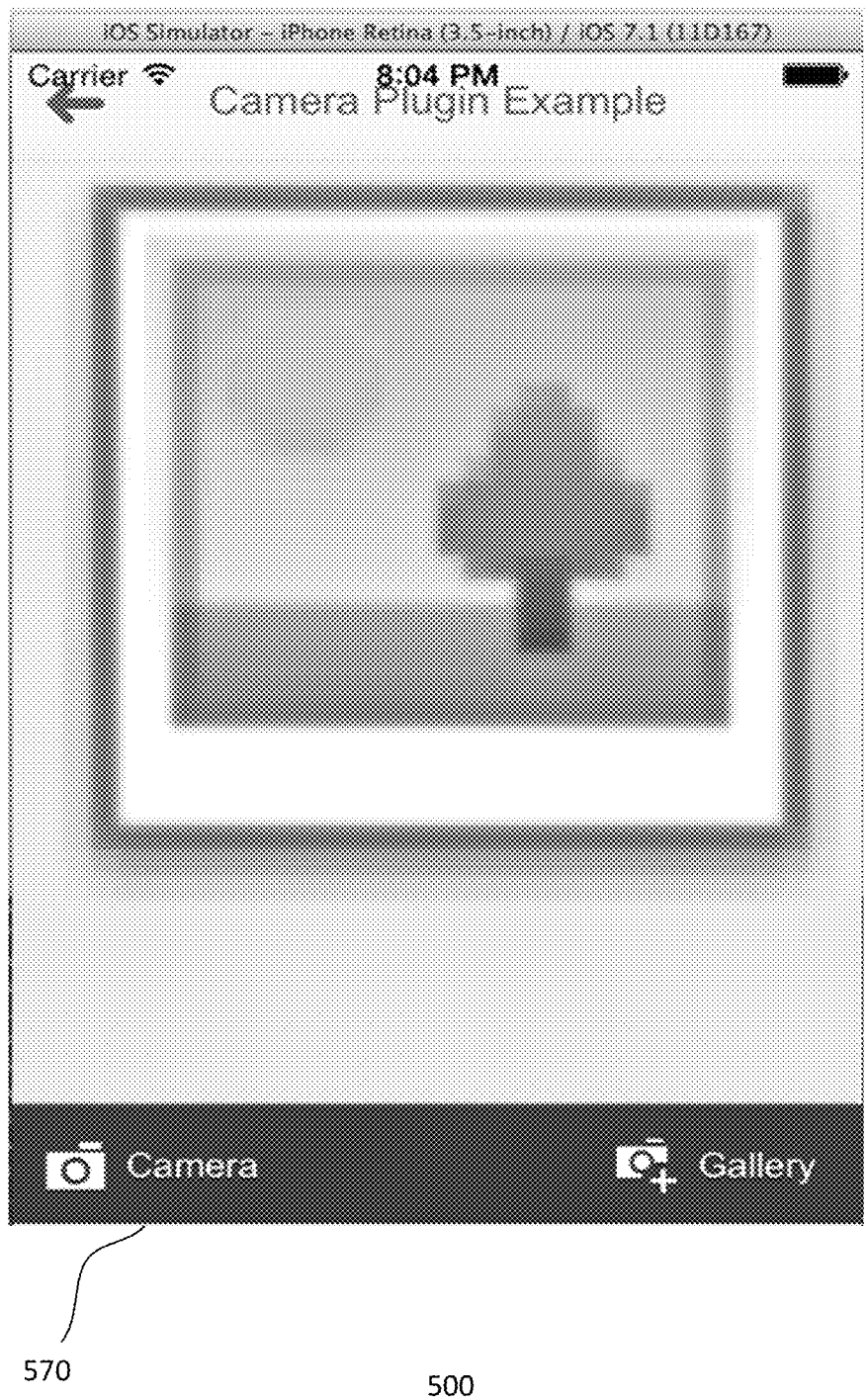

Referring to FIG. 5c, the App running in the companion App in the android simulator is shown. In this example, an App page 541 is shown. The App page includes various icons or items 542 and 544. In one implementation, the items include product categories 542 and business partners 544 icons which may be selectable by a user. In FIG. 5d, an App page 550 corresponding to product categories is shown. For example, when the product categories icon is selected, the page that displays various products is provided. As shown in FIG. 5e, an App page 560 is shown. The App page shown is running on an iOS simulator. The page shows various native resources 562, 564 and 566 which may be selectable by a user. As shown, the page includes a camera plugin, a contact plugin and a geolocation plugin. Other types of plugins may be included. In FIG. 5f, an App page 570 simulates when a user selects the camera plugin.

As described, the application development system may be embodied as an application. For example, the application development system may be embodied as a software application. The different components of the system may be separate software applications configured to operate or interact with each other, whether on the cloud or on the end-user devices. The source code of the applications may be compiled to create an executable code. The codes, for example, may be stored in a storage medium, such as one or more storage disks or in memory of a server and/or end-user devices. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for developing an application, comprising:
developing the application using an integrated development environment (IDE) with a preview function;
selecting the preview function, the preview function previews the application; and
in response to the selection of the preview function, the IDE causes
a companion application on an end-user device to be launched onto an application simulator on the end-user device, wherein the companion application is a container application comprising plugins of local resources which include plugins for enabling one or more mobile functions on the end-user device, and running the application in the companion application, wherein the application has access to the local resources on the end-user device provided by the companion application, and
a local server component on the end-user device to serve as an interface between the IDE and a local command line environment of the end-user device;
wherein:
a browser receives a preview command from the IDE in response to selecting the preview function and the preview command is executed on the local command line environment by the local server component;
executing the preview command launches the companion application in the application simulator and run the application within the companion application;
executing the preview command includes passing the universal resource locator (URL) of the application; and
running the application within the companion application in the application simulator enables access to local resources of a device simulated by the application simulator.

2. The computer-implemented method of claim 1 wherein:
the IDE comprises a cloud-based IDE residing on a cloud; and
access to the IDE is through the browser on the end-user device.

3. The computer-implemented method of claim 1 wherein the one or more mobile functions comprises a touch gesture function, a camera function, or a collaboration function.

4. The computer-implemented method of claim 2 comprising executing commands from the cloud-based IDE by the local server component using the local command line environment.

5. The computer-implemented method of claim 2 comprising:
the browser receiving commands from the cloud-based IDE; and
the local server component executing commands from the cloud-based IDE using the local command line environment.

6. The computer-implemented method of claim 1 wherein the companion application comprises:
a frame in which the application to be simulated runs; and
plugins for local resources of the device simulated to enable simulation of local resources used by the application.

7. The computer-implemented method of claim 6 wherein the plugins comprise Cordova and Kapsel plugins.

8. A system for developing an application, comprising:
at least one programmable data processor; and
memory storing instructions which, when executed by the at least one programmable data processor, result in operations comprising:
developing the application using an integrated development environment (IDE) with a preview function;
selecting the preview function, the preview function previews the application; and
in response to the selection of the preview function, the IDE causes
a companion application on an end-user device to be launched onto an application simulator on the end-user device, wherein the companion application is a container application comprising plugins of local resources which include plugins for enabling one or more mobile functions on the end-user device, and running the application in the companion application, wherein the application has access to the local resources on the end-user device provided by the companion application, and a local server component on the end-user device to serve as an interface between the IDE and a local command line environment of the end-user device;

wherein:

a browser receives a preview command from the IDE in response to selecting the preview function and the preview command is executed on the local command line environment by the local server component;

executing the preview command launches the companion application in the application simulator and run the application within the companion application;

executing the preview command includes passing the universal resource locator (URL) of the application; and running the application within the companion application in the application simulator enables access to local resources of a device simulated by the application simulator.

9. The system of claim 8 wherein:

the IDE comprises a cloud-based IDE residing on a cloud; and access to the IDE is through the browser on the end-user device.

10. The system of claim 8 wherein the one or more mobile functions comprises a touch gesture function, a camera function, or a collaboration function.

11. The system of claim 9, wherein the operations further comprise executing commands from the cloud-based IDE by the local server component using the local command line environment.

12. The system of claim 9, wherein the operations further comprise:

the browser receiving commands from the cloud-based IDE; and the local server component executing commands from the cloud-based IDE using the local command line environment.

13. The system of claim 8 wherein the companion application comprises:

a frame in which the application to be simulated runs; and plugins for local resources of the device simulated to enable simulation of local resources used by the application.

14. The system of claim 13 wherein the plugins comprise Cordova and Kapsel plugins.

15. A non-transitory computer program product for developing an application, the non-transitory computer program product storing instructions which, when executed by at least one programmable data processor, result in operations comprising:

developing the application using an integrated development environment (IDE) with a preview function;

selecting the preview function, the preview function previews the application; and in response to the selection of the preview function, the IDE causes a companion application on an end-user device to be launched onto an application simulator on the end-user device, wherein the companion application is a container application comprising plugins of local resources which include plugins for enabling one or more mobile functions on the end-user device, and running the application in the companion application, wherein the application has access to the local resources on the end-user device provided by the companion application, and a local server component on the end-user device to serve as an interface between the IDE and a local command line environment of the end-user device;

wherein:

a browser receives a preview command from the IDE in response to selecting the preview function and the preview command is executed on the local command line environment by the local server component;

executing the preview command launches the companion application in the application simulator and run the application within the companion application;

executing the preview command includes passing the universal resource locator (URL) of the application; and running the application within the companion application in the application simulator enables access to local resources of a device simulated by the application simulator.

16. The computer program product of claim 15 wherein:

the IDE comprises a cloud-based IDE residing on a cloud; and access to the IDE is through the browser on the end-user device.

17. The computer program product of claim 15 wherein the one or more mobile functions comprises a touch gesture function, a camera function, or a collaboration function.

18. The computer program product of claim 16, wherein the operations further comprise executing commands from the cloud-based IDE by the local server component using the local command line environment.

19. The computer program product of claim 16, wherein the operations further comprise:

the browser receiving commands from the cloud-based IDE; and the local server component executing commands from the cloud-based IDE using the local command line environment.

20. The computer program product of claim 15 wherein the companion application comprises:

a frame in which the application to be simulated runs; and plugins for local resources of the device simulated to enable simulation of local resources used by the application.

21. The computer program product of claim 20 wherein the plugins comprise Cordova and Kapsel plugins.

* * * * *